March 29, 1927. 1,622,987
H. AUSTIN
WORM AND WORM WHEEL TRANSMISSION
Filed Nov. 29, 1926
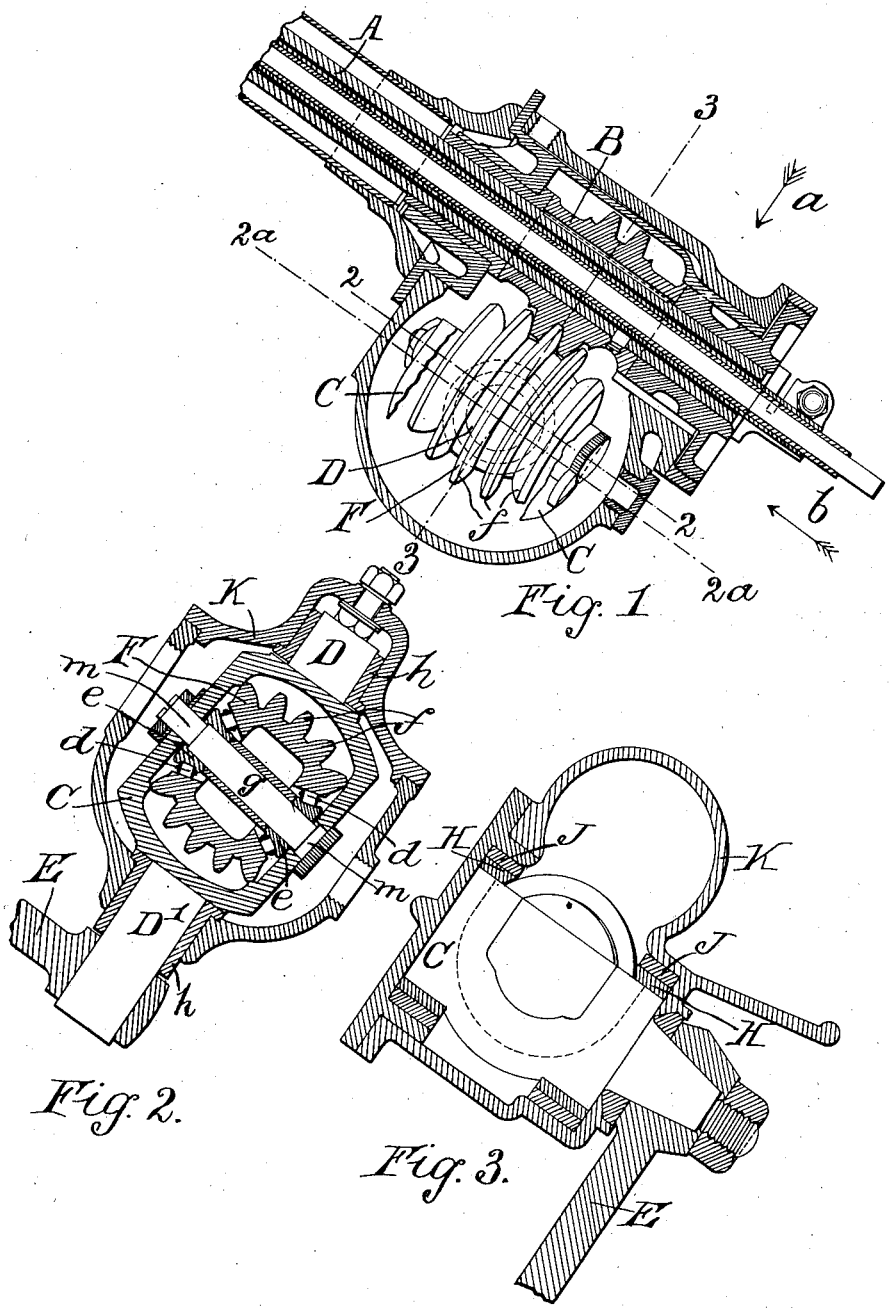
Fig. 1.
Fig. 2.
Fig. 3.
Herbert Austin
By 

Patented Mar. 29, 1927.

1,622,987

UNITED STATES PATENT OFFICE.

HERBERT AUSTIN, OF BROMSGROVE, ENGLAND.

WORM AND WORM-WHEEL TRANSMISSION.

Application filed November 29, 1926, Serial No. 151,491, and in Great Britain February 11, 1926.

This invention relates to worm and worm-wheel transmission and especially to such transmission as applied to motor road vehicle steering gear.

According to this invention, the worm is parallel sided, that is to say the convolutions of the worm are formed upon a part which is otherwise cylindrical, and the usual radial teeth of the worm-wheel are replaced by a set of ring teeth carried upon the periphery of one or more rollers of which each has its mid-plane substantially radial to the worm wheel centre.

In the case of vehicle steering gear, the number of ring teeth need only be sufficient to ensure that there is always one at least of the ring teeth in engagement with the worm and the latter may be mounted on a sleeve of the steering column in the usual way. The worm wheel may be constituted as an arm or bracket carrying a roller provided with a set of ring teeth decreasing in diameter outwards of the mid-plane of the roller, and the arm or bracket may be rigid with a shaft on which the steering arm is mounted. The curve passing through the periphery of the ring teeth in a direction longitudinally of the roller is concentric with the axis of the shaft, whereby the ring teeth, or some of them, are always in proper engagement with the worm.

In order that the invention may be clearly understood convenient practical applications thereof are described with reference to the drawings herewith, of which:—

Figure 1 is a longitudinal vertical section through the lower end of the steering column of a motor vehicle showing the worm in section but the roller of the worm wheel in elevation.

Figure 2 is a sloping sectional plan view, the section being taken partly in the plane indicated by the line 2, 2, of Figure 1 and partly in the plane indicated by the line 2ª 2ª of Figure 1, and looking in the direction of the arrow a of that Figure.

Figure 3 is a sectional view to illustrate a modification, but in this case the section is taken in what would be a plane corresponding to that indicated by the line 3, 3, of Figure 1 and looking in the direction of the arrow b of that Figure.

Referring first to Figures 1 and 2, A is the steering tube on the upper end of which is rigidly secured the steering wheel, not shown. To the lower end of the tube A is keyed a worm B the peripheral surface of the thread of which forms part of an imaginary cylinder. C is a bracket of somewhat box-like form mounted to turn upon a pair of trunnions D D' of which the trunnion D' has rigidly secured upon its end the steering arm E which is coupled to the stub axles in the usual way. The trunnions D D' are mounted in bearings h of the steering gear casing K. F is a roller which is provided with a set of ring teeth f and is mounted to turn within the bracket C upon roller bearings d which revolve upon cones e carried by a pin g which is secured in the bracket C. The axis of the pin g is placed at such an angle that the ring teeth f, where they engage with the worm, are parallel to the thread of the worm. It will be noticed from Figure 1 that the axis of the pin g is placed slightly nearer to the worm than is the axis of the trunnions D D'. It will also be noticed that the middle ring tooth is of the maximum diameter and that the other ring teeth are of successively decreasing diameters outwards, also that the longitudinal curve which passes through the peripheries of the teeth is struck from the axis of the trunnions D D' while the axes of the teeth are radial to the centre of the curve.

When the tube A is turned to rotate the worm B, the thread thereof, by engaging with the ring teeth f, turns the bracket C about the trunnions D D' thus operating the steering arm E, and, owing to the fact that the peripheries of the teeth are in a curve struck from the axis of the trunnions D D', two at least of the ring teeth are in perfect engagement with the worm.

The end portions m m of the pin g, where it bears in the bracket C, are eccentric to the middle portion of the pin which carries the cones of the bearings of the roller, whereby the latter can be adjusted in relation to the worm by turning the pin g.

It will be seen from the construction that any endwise movement of the worm due to wear or other cause in no way interferes with the proper engagement of the worm with the ring teeth.

The turning of the worm, of course rotates the roller F, bringing fresh portions of the ring teeth into engagement with the worm so that the wear is distributed over the whole of each ring tooth.

Referring to Figure 3 the mounting of the bracket C is modified in order to save space. In this case the bracket is provided with a ring journal H at each end and these engage within ring bearings J which are secured within the casing K. In this way the length of the casing may be considerably reduced.

Having fully described my invention what I claim and desire to secure by Letters Patent is:—

1. Worm and worm-wheel transmission comprising, a parallel sided worm, a pivotally mounted worm-wheel element having its pivoted axis angularly disposed with reference to its axis of rotation, and ring tooth members rotatably carried by the said element and engaging with the convolutions of the worm.

2. Worm and worm wheel transmission comprising, a parallel sided worm, a pivotally mounted worm wheel element, a roller rotatably mounted in said worm wheel element and having its mid-plane radial to the pivot axis of the element, and ring tooth members carried by the said roller and engaging with the convolutions of the worm.

3. Worm and worm-wheel transmission comprising, a parallel sided worm, a pivotally mounted worm-wheel element having its pivoted axis angularly disposed with reference to its axis of rotation, a roller rotatably mounted in said worm-wheel element and having its mid-plane radial to the pivot axis of the element, and ring tooth members carried by the said roller, and engaging with the convolutions of the worm, the axis of said roller being inclined to the axis of the worm, so as to cause the ring teeth to be parallel to the thread of the worm at the points where they engage therewith.

4. Worm and worm-wheel transmission comprising, a parallel-sided worm, a pivotally mounted worm-wheel element, a roller rotatably mounted in the said worm-wheel element and having its mid plane radial to the pivot axis of the element, and ring tooth members carried by the said roller and engaging with the convolutions of the worm, the diameters of the ring tooth members decreasing successively outwards.

5. Worm and worm-wheel transmission comprising, a worm, a pivotally mounted worm-wheel element, a roller rotatably mounted in said worm-wheel element and having its mid-plane radial to the pivot axis of the element, and ring tooth members carried by the said roller and engaging with the convolutions of the worm.

6. Worm and worm-wheel transmission comprising, a worm, a pivotally mounted worm-wheel element, a roller rotatably mounted in said worm-wheel element and having its mid-plane radial to the pivot axis of the element, and ring tooth members carried by the said roller, and engaging with the convolutions of the worm, the axis of said roller being inclined to the axis of the worm, so as to cause the ring teeth to be parallel to the thread of the worm at the points where they engage therewith.

7. Worm and worm-wheel transmission comprising, a worm, a pivotally mounted worm-wheel element, a roller rotatably mounted in the said worm-wheel element and having its mid-plane radial to the pivot axis of the element, and ring tooth members carried by the said roller and engaging with the convolutions of the worm, the diameters of the ring tooth members decreasing successively outwards.

In witness whereof I have hereunto signed my name this 9th day of November, 1926.

HERBERT AUSTIN.